United States Patent
Slobodin

(10) Patent No.: US 6,899,436 B2
(45) Date of Patent: May 31, 2005

(54) PROJECTION APPARATUS WITH AXIS PARALLEL MICRO MIRRORS AND LIGHT SOURCES

(75) Inventor: David E. Slobodin, Lake Oswego, OR (US)

(73) Assignee: InFocus Corporation, Wilsonville, OR (US)

(*) Notice: Subject to any disclaimer, the term of this patent is extended or adjusted under 35 U.S.C. 154(b) by 0 days.

(21) Appl. No.: 10/670,721

(22) Filed: Sep. 24, 2003

(65) Prior Publication Data

US 2005/0062944 A1 Mar. 24, 2005

(51) Int. Cl.[7] .............................................. G03B 21/28
(52) U.S. Cl. ............................ 353/94; 353/98; 348/771
(58) Field of Search ............................. 353/31, 34, 37, 353/98, 99; 348/742, 743, 771; 345/82, 83; 359/224, 292, 291

(56) References Cited

U.S. PATENT DOCUMENTS

| | | | |
|---|---|---|---|
| 5,442,414 A | | 8/1995 | Janssen et al. |
| 5,971,545 A | * | 10/1999 | Haitz ........................... 353/31 |
| 6,224,216 B1 | * | 5/2001 | Parker et al. .................. 353/31 |
| 6,281,949 B1 | | 8/2001 | Matsui et al. |
| 6,457,833 B1 | * | 10/2002 | Ishikawa et al. ............... 353/99 |
| 2003/0067590 A1 | * | 4/2003 | Shin ............................. 353/99 |
| 2003/0117591 A1 | * | 6/2003 | Stanton ........................ 353/31 |
| 2003/0117595 A1 | * | 6/2003 | Li et al. ........................ 353/31 |
| 2003/0218794 A1 | * | 11/2003 | Takeda et al. ............... 359/292 |

* cited by examiner

Primary Examiner—William C. Dowling
(74) Attorney, Agent, or Firm—Schwabe, Williamson & Wyatt, P.C.

(57) ABSTRACT

A projection apparatus is formed employing at least one micro mirror with a tilt axis disposed on a first plane, and a number of light sources disposed on a light source axis disposed on a second plane, where the light source axis is parallel to the tilt axis.

27 Claims, 3 Drawing Sheets

PROJECTION APPARATUS WITH AXIS PARALLEL MICRO MIRRORS AND LIGHT SOURCES

BACKGROUND

Historically, projection engines of projection systems have been designed employing high intensity discharge lamps. These prior art projection engines/systems suffer from a number of disadvantages. For examples, the lamps typically have relatively short lives, and reduced brightness after an initial period of usage. Further, there is an appreciable period of waiting for the lamp to warm up, when a projection engine/system is first turned on. During that period, either no image is available or the available images are of poor quality. Additionally, active cooling arrangements are typically required to dissipate the heat created during operation.

Resultantly, there has been a lot of interest in developing and manufacturing in a mass scale projection engines and projection systems employing solid state light sources. Such engines/systems typically either do not have or have the aforementioned disadvantages in a lesser degree. Examples of solid state light sources include but are not limited to light emitting diodes (LED), laser diodes and so forth.

FIG. 1 illustrates a plane view of a typical solid state light source and micro mirror light valve based projection system architecture. The plane view may be a top view or a side view of the projection system. As illustrated, solid state light source based projection system 100 includes a number of primary color solid state light sources, such as LED 102–106 sourcing red (R), green (G) and blue (B) lights respectively. LED 102–106 are arranged in an orthogonal manner, respectively disposed on 3 sides of prism or dichroic combiner 108. Prism or dichroic combiner 108 is employed to combine the lights emitted by LED 102–106. Further, light integrator 110 is placed in the light path to enhance the combined light. Mirror 112 is employed to reflect the enhanced light onto micro mirror device 114.

Micro mirror device 114 includes a number of micromirrors that may be individually tilted to an "on" or an "off" position to selectively reflect the enhanced light reflected from mirror 112 towards projection lens 116 ("on") or away from projection lens 116 ("off"). Resultantly, with each micro mirror corresponding to a pixel, and by selectively controlling their positions, an image or a series of images, including a series of images forming a motion picture, may be projected.

While the architecture of FIG. 1 works well, it is nevertheless desirable to further improve on reducing the cost and/or increasing reliability of the next generation of projection engines and projection systems.

BRIEF DESCRIPTION OF THE DRAWINGS

Embodiments of the present invention will be described by way of the accompanying drawings in which like references denote similar elements, and in which.

DETAILED DESCRIPTION OF EMBODIMENTS OF THE INVENTION

Embodiments of the present invention include but are not limited to projection engines and projection systems having axis parallel micro mirrors and lights sources.

In the following description, various aspects of embodiments of the present invention will be described. However, it will be apparent to those skilled in the art that other embodiments may be practiced with only some or all of the described aspects. For purposes of explanation, specific numbers, materials and configurations are set forth in order to provide a thorough understanding of the embodiments. However, it will be apparent to one skilled in the art that other embodiments may be practiced without the specific details. In other instances, well-known features are omitted or simplified in order not to obscure the description.

Various operations will be described as multiple discrete operations in turn, in a manner that is most helpful in understanding the embodiments, however, the order of description should not be construed as to imply that these operations are necessarily order dependent. In particular, these operations need not be performed in the order of presentation.

The phrase "in one embodiments" is used repeatedly. The phrase generally does not refer to the same embodiment, however, it may. The terms "comprising", "having" and "including" are synonymous, unless the context dictates otherwise.

Figure 1:
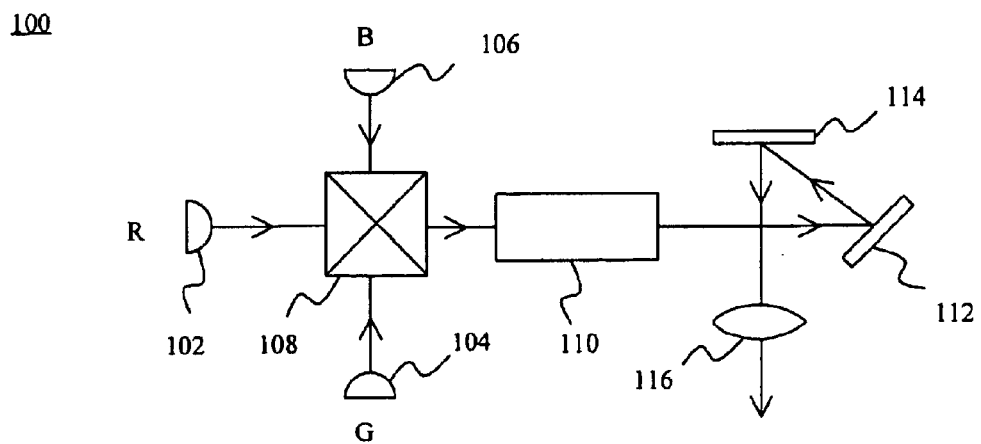
FIG. 1 illustrates a plane view of a typical prior art solid state light source based projection engine/system.
Figure 2:
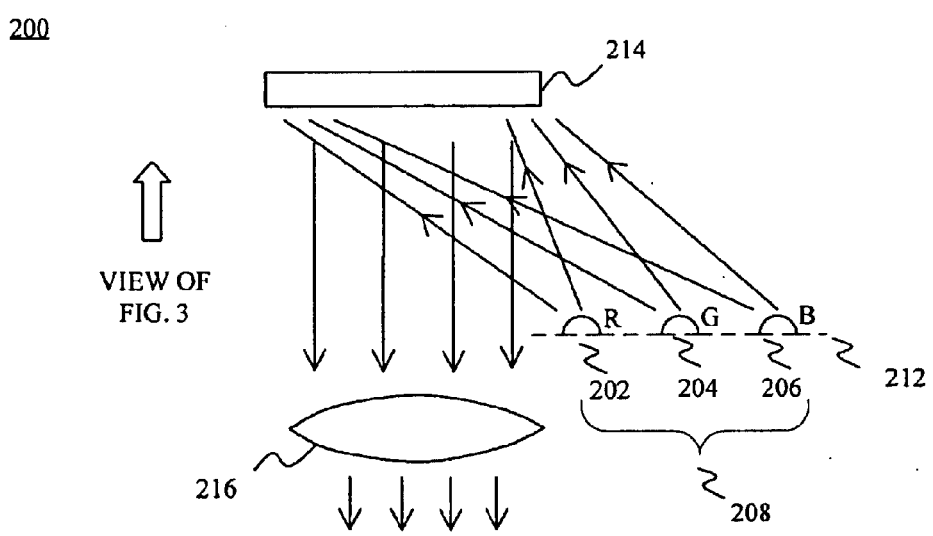
FIG. 2 illustrates a plane view of a projection engine/system in accordance with one embodiment of the present invention.

Referring first to FIG. 2 wherein a plane view of a projection engine (which may be a portion of a projection system) 200 in accordance with one embodiment of the present invention is illustrated. Similar to FIG. 1, the plane view may be a top view or a side view of projection engine/system 200. As illustrated, for the embodiment, projection engine/system 200 includes light sources 208, micro mirror device 214, and projection lens 216, optically coupled to each other as shown.

Figure 3:
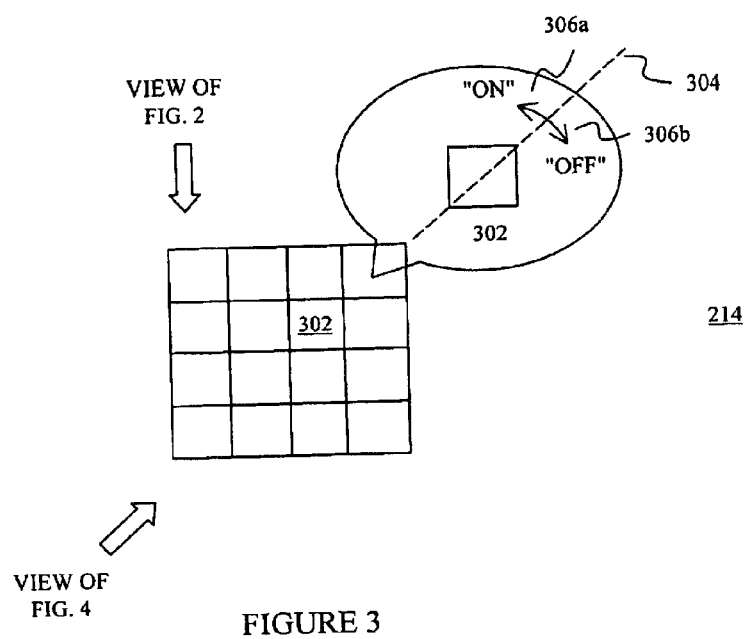
FIG. 3 illustrates a front view of a micro mirror including its tilt axis and on/off positions.

As illustrated in further detail in FIG. 3 (which is a plane view of micro mirror device 214 in a plane orthogonal to the plane of FIG. 2), micro mirror device 214 includes a number of micro mirrors 302. In particular, each micro mirror 302 has a tilt axis 304 over which the micro mirror may tilt in one or more directions to allow micro mirror 302 to assume at least two positions. In one position, micro mirror 302 reflects light towards projection lens 216. In this position, micro mirror 302 is said to be in the "on" position. In another position, micro mirror 302 reflects light away from projection lens 216. In this other position, micro mirror 302 is said to be in the "off" position.

Referring to FIG. 2 again, accordingly, lights selectively emitted from light sources 208 may be selectively reflected by micro mirrors 302 of micro mirror device 214 towards projection lens 216 for use to project an image, or a series of images, including a series of images forming a motion picture.

In various embodiments, each micro mirror 302 may correspond to a pixel of an image.

Still referring to FIG. 2, for the embodiment, light sources 202–206 are preferably solid state light sources, such as light emitting diodes (LED), laser diodes or other light emitting elements of the like. Moreover, light sources 202–206 may be primary color light sources. In various embodiments, primary color light sources 208 comprise at least one each of a red (R) color light source 204, a green (G) color light source 206, and a blue (B) color light source 208. Alternate embodiments may be practiced with other primary colors.

Figures 4A, 4B:
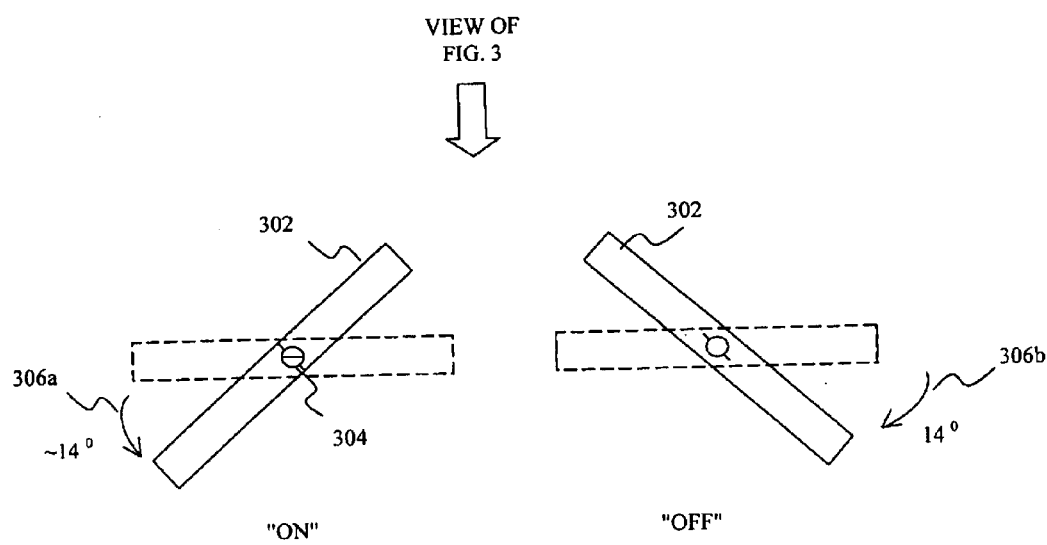
FIGS. 4a-4b illustrate two diagonal end views of a micro mirror in accordance with one embodiment.

As illustrated in further detail in FIGS. 4a-4b (which are diagonal end views of a micro mirror 302), typically, the amount of tilt between the "on" and the "off" positions is about 14 degrees. For the embodiment illustrated in FIGS. 4a-4b, micro mirror 302 tilts in two directions. However, as described earlier, in alternate embodiments, micro mirror 302 may tilt in one direction only.

Again referring back to FIG. 2, light sources 208, comprising of constituting light sources 202–206, are disposed along axis 212, referred to as light source axis.

Figure 5:
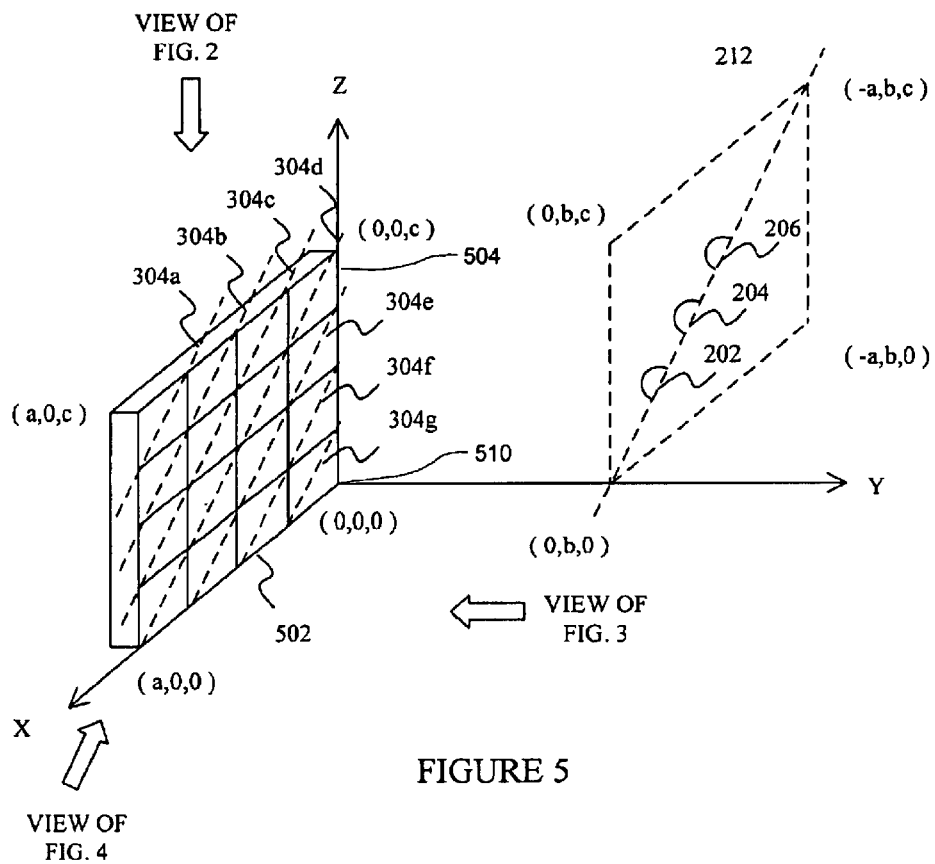
FIG. 5 illustrates a perspective view of the micro mirror device and the light sources of FIG. 2, including their geometric relationship.

As illustrated in further detail in FIG. 5 (which is a perspective view of micro mirror device 214 and light sources 208), light source axis 212 on which light sources 202–206 are disposed, is advantageously parallel to tilt axes 304a–304g.

As illustrated, with the aid of a coordinate system which x and z axes coincide with the "bottom" and "right" edges 502 and 504 respectively, and the origin coincides with the "lower right" corner 510 of micro mirror device 214, tilt axis 304d of the diagonal micro mirrors may be considered as being coincident with the line including points (a, 0, 0) and (0, 0 c), which is disposed on the plane where y=0. Geometrically speaking, the line may be characterized by the equation $z=-(c/a)*x+c$ with $y=0$.

Employing the same coordinate system, light source axis 212 may be considered as being coincident with the line including points (−a, b, c) and (0, b, 0), which is disposed on the plane where y=b. Geometrically speaking, the line may be characterized by the equation $z=-(c/a)*x$ with $y=b$.

Accordingly, tilt axis 304d and light source axis 212 are parallel to each other. Similarly, since tilt axes 304a–304c and 304e–304g are parallel to tilt axis 304d, these tilt axes 304a–304c and 304e–304g and light source axis 212 are also parallel to each other.

In view of the geometric manner each micro mirror 302 tilts to reflect lights towards or away from lens 216, "parallel" light source axis 212 advantageously provides the "largest" or "most flexible" geometric range, relative to other axial arrangements, to accommodate multiple ones of lights sources 202–206.

Further, in various embodiments, light sources 208 are designed to illuminate with illumination cone angles that are expanded in the direction parallel to tilt axis 304. The anamorphic illumination enables brightness to be enhanced without loss of contrast.

Therefore, when so disposed, multiple light sources 202–206, especially solid state embodiments, may be employed to form light sources 208 providing the desired anamorphic illumination. In turn, projection engine/system 200 may be formed without the need to employ a prism/ dichroic combiner, nor a light integrator. Resultantly, a projection engine/system 200 so formed, is likely to be more compact, possibly more cost effective, as well as possibly brighter without loss of contrast.

Still referring to FIG. 5, in addition to being parallel to each other, such that the "on" state is directed through the projection lens, for the embodiment, light source axis 212 is "offset" to one side of micro mirror device 214. In other words, light sources 202–206 project onto micro mirrors 302 of micro mirror device 214 in an angular or non-orthgonal manner. While for ease of understanding, only one offset position (to the−x direction (without any offset in the+/−z direction), in term of the coordinate system of FIG. 5) has been illustrated, alternate embodiments may be practiced with light source axis 212 offset in other directions. These other directions may include but are not limited to offset in the−x direction with offset in the+/−z direction, or to the+x direction with or without offset in the+/−z direction.

Referring again to FIGS. 3 and 5, while for ease of understanding, only 16 micro mirrors are shown for each micro mirror device 214, in practice, micro mirror device 214 typically includes many more micro mirrors. For examples, various embodiments of micro mirror device 214 may include as many as 1,024 micro mirrors.

Further, while for ease of understanding, only the diagonal version of tilt axis 304 has been illustrated and described, in practice, micro mirrors 302 may tilt over a horizontal axis or a vertical axis. In the former case, the horizontal axis runs horizontally along a center portion of micro mirror 302 (dividing micro mirror 302 in two substantially equal portions, an "upper" portion and a "lower" portion). Correspondingly, light source axis 212 would be a parallel "horizontal" axis.

In the latter case, the vertical axis runs vertically along a center portion of micro mirror 302 (dividing micro mirror 302 in two substantially equal portions, a "left" portion and a "right" portion). Correspondingly, light source axis 212 would be a parallel "vertical" axis.

In other words, tilt axis 304 may be any one of a number of types of tilt axes. Embodiments of projection engine/ system 200 will be formed with light sources 202–206 forming light sources 208 correspondingly disposed on a substantially parallel axis, providing sufficient amount of space and flexibility for the accommodation of the multiple desired ones of light sources 202–206.

Referring now to FIGS. 1 and 5, while for ease of understanding, three light sources 204–206 are illustrated, alternate embodiments may be practiced with more or less light sources being disposed along the parallel light source axis 212. Further, while light sources 204–206 have been described as single primary color solid state light sources, such as R, G and B LED/laser diodes, alternate embodiments may be practiced with multiple color solid state light sources, and/or light sources of other primary colors.

Figure 6:
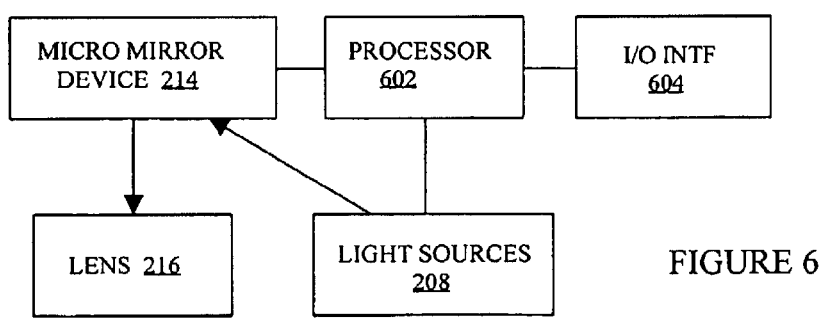
FIG. 6 illustrates an example projection system in accordance with one embodiment.

Referring now to FIG. 6, a block diagram illustrating a projection system in accordance with an embodiment of the present invention is shown. As illustrated, projection system 600 includes micro mirror device 214, light sources 208 and projection lens 216, optically coupled to each other as earlier described.

Further, projection system 600 includes processor 602 and digital input interface 604 coupled to each other and the earlier enumerated elements as shown.

Digital input interface 604 facilitates provision of data of an image to be projected to processor 602 in digital form. As described earlier, the image may be an image of a series of images, in particular, a series of images forming a motion picture. Processor 602 in turn controls light sources 208 and micro mirrors 302 of micro mirror device 214 accordingly, based on the data provided, to facilitate projection of the image through projection lens 216.

Processor 602 and digital I/O interface 604 represent broad corresponding ranges of the elements. In various embodiments, processor 602 may be a general purpose microprocessor, while in other embodiments, it may be a special purpose application specific integrated circuit (ASIC). Similarly, in various embodiments, digital I/O interface 604 may e.g. be a DVI compliant (or compatible) interface (i.e. compliant or compliant to DVI 1.0 Specification published by DDWG. [DVI=Digital Video Interface, and DDWG–Digital Display Working Group.]

Thus, it can be seen from the above description, a projection engine and a projection system having axis parallel micro mirrors and light sources have been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. A projection engine comprising:
   a first micro mirror having a first tilt axis disposed on a first plane;
   a plurality of light sources optically coupled to the first micro mirror, and disposed along a light source axis disposed on a second plane, where the light source axis disposed on the second plane is parallel to the first tilt axis disposed on the first plane.

2. The projection engine of claim 1, wherein the light sources illuminate with illumination cone angles that are expanded in a direction paralleling the first tilt axis.

3. The projection engine of claim 1, wherein the light sources are primary color light sources comprising at least two of a red color light source, a blue color light source, and a green color light source.

4. The projection engine of claim 1, wherein the light sources comprise at least one solid state light source.

5. The projection engine of claim 4, wherein the at least one solid state light source comprises at least a selected one of a light emitting diode and a laser diode.

6. The projection engine of claim 1, wherein the projection engine comprises a micro mirror device having a plurality of micro mirrors including the first micro mirror and a second micro mirror having the same first tilt axis.

7. The projection engine of claim 1, wherein the projection engine comprises a micro mirror device having a plurality of micro mirrors including the first micro mirror and a second micro mirror having a second tilt axis disposed in the first plane, where the light source axis is also parallel to the second tilt axis.

8. The projection engine of claim 1, wherein the light sources are optically coupled to the first micro mirror in a non-orthogonal angular manner.

9. The projection engine of claim 1, wherein the light sources directly project onto the first micro mirror.

10. The projection engine of claim 1, wherein the first tilt axis is a diagonal tilt axis.

11. The projection engine of claim 1, wherein the first tilt axis is a selected one of a horizontal tilt axis and a vertical tilt axis.

12. A projection system comprising:
    a projection lens;
    a micro mirror device including a plurality of micro mirrors having a plurality of parallel tilt axes disposed on a first plane; and
    a plurality of light sources optically coupled to the projection lens through the micro mirror device, and disposed along a light source axis disposed on a second plane, where the light source axis is parallel to the tilt axes.

13. The projection system of claim 12, wherein the plurality of light sources illuminate with illumination cone angles that are expanded in a direction paralleling the tilt axes.

14. The projection system of claim 12, wherein the plurality of light sources comprise at least two of a red color light source, a blue color light source, and a green color light source.

15. The projection system of claim 12, wherein the plurality of light sources comprise at least one solid state light source.

16. The projection system of claim 15, wherein the at least one solid state light source comprises at least a selected one of a light emitting diode and a laser diode.

17. The projection system of claim 12, wherein the plurality of light sources are optically coupled to the micro mirror device in a non-orthogonal angular manner.

18. The projection system of claim 12, wherein the plurality of light sources directly project onto the micro mirrors.

19. The projection system of claim 12, wherein the projection system further comprises
    a processor coupled to the micro mirrors and the light sources to control the micro mirrors and the light sources to project an image; and
    a digital input interface coupled to the processor to facilitate input to the processor pixel data of the image in digital form.

20. The projection system of claim 19, wherein the projection system further comprises a television tuner.

21. The projection system of claim 12, wherein at least one of the tilt axes is a diagonal tilt axis.

22. The projection system of claim 12, wherein at least one of the first tilt axes is a selected one of a horizontal tilt axis and a vertical tilt axis.

23. In a projection apparatus, a method of operation comprising:
    controlling a plurality of light sources disposed on a light source axis disposed on a first plane to selectively emit lights; and
    controlling a plurality of micro mirrors optically coupled to the light sources to selectively tilt relative to a plurality of tilt axes to selectively reflect the lights selectively emitted by the light sources, at least one of the plurality of tilt axes being parallel with the light source axis.

24. The method of claim 23, wherein said controlling the plurality of light sources comprises controlling the light sources to emit lights with illumination cone angles that are expanded in a direction paralleling the tilt axes.

25. The method of claim 23, wherein the method further comprises
    receiving inputs for an image to be projected, in digital form; and
    performing both of the controlling based at least in part on the inputs received.

26. The projection engine of claim 1, wherein the light sources illuminate with illumination cones that are expanded in a direction paralleling the first tilt axis.

27. The projection system of claim 12, wherein the plurality of light sources illuminate with illumination cones that are expanded in a direction paralleling the first tilt axis.

* * * * *